United States Patent [19]

von Bonin

[11] Patent Number: 5,573,706
[45] Date of Patent: Nov. 12, 1996

[54] GEL FORMERS AND GELS, THEIR PREPARATION AND USE

[75] Inventor: Wulf von Bonin, Odenthal, Germany

[73] Assignee: Bayer Aktiengesellschaft, Leverkusen, Germany

[21] Appl. No.: 143,427

[22] Filed: Oct. 26, 1993

[30] Foreign Application Priority Data

Nov. 2, 1992 [DE] Germany .......................... 42 36 936.3
Mar. 11, 1993 [DE] Germany .......................... 43 07 631.9

[51] Int. Cl.$^6$ .......................... B01J 13/00; C09K 21/00; C04B 16/00
[52] U.S. Cl. .................. 252/315.01; 252/315.1; 252/315.2; 252/606; 252/610; 252/611; 252/378 R; 106/18.13; 106/18.15
[58] Field of Search .................. 252/315.01, 315.1, 252/315.2, 610, 611, 606, 378 R; 428/426, 427, 428; 106/18.15, 18.13

[56] References Cited

U.S. PATENT DOCUMENTS

| | | | |
|---|---|---|---|
| 4,190,698 | 2/1980 | De Boel et al. | 428/334 |
| 4,725,382 | 2/1988 | Lewchalermwong | 252/607 |
| 4,935,457 | 6/1990 | Metzner et al. | 524/14 |
| 5,151,225 | 9/1992 | Herndon et al. | 252/607 |
| 5,156,775 | 10/1992 | Blount | 252/609 |
| 5,182,049 | 1/1993 | von Bonin | 252/378 R |
| 5,328,719 | 7/1994 | von Bonin | 427/165 |
| 5,425,901 | 6/1995 | von Bonin et al. | 252/610 |

FOREIGN PATENT DOCUMENTS

| | | |
|---|---|---|
| 306677 | 7/1988 | European Pat. Off. . |
| 0306677 | 7/1988 | European Pat. Off. . |
| 468259 | 7/1991 | European Pat. Off. . |
| 527401 | 7/1992 | European Pat. Off. . |
| 4020459 | 1/1992 | Germany . |
| 4023310 | 1/1992 | Germany . |
| 4126702 | 2/1993 | Germany . |

OTHER PUBLICATIONS

Derwent Abstract, Week 7646, AN 76–85658 & JP–A–760 928, Sep. 28, 1976.

*Primary Examiner*—Sharon Gibson
*Assistant Examiner*—Joseph D. Anthony
*Attorney, Agent, or Firm*—Sprung Horn Kramer & Woods

[57] ABSTRACT

Gel formers and gels contain
a) acidic aluminium phosphates, optionally in the form of reaction products with 0.01 to 4 mol of alkanolamines per mol of aluminium phosphate, and
b) reaction products of boric acid with alkanolamines, a) and b) being present in a weight ratio of 100:55 to 100:0.5, calculated as solids.

7 Claims, No Drawings

GEL FORMERS AND GELS, THEIR PREPARATION AND USE

The present invention relates to gel formers and gels, containing water, aluminium phosphate, boron and an amine, the preparation of gels from thermally gellable gel formers and uses of these gel formers and gels.

EP-B 306 677 describes, as fireproofing gels, combinations of monoaluminium hydrogen phosphate and boric acid in a weight ratio of from 10 to 25 in the form of 80% strength by weight and more highly concentrated solutions which have an extrudable, gel-like character but become molten in the event of a fire, casting doubt on the protective effect.

To avoid such difficulties, DE-A 4 020 459 describes a gel system in which an acrylic acid derivative and a photo-initiator are dissolved in an aluminium phosphate solution and this solution is polymerized by exposure to light. The polymerization to be carried out and the additional handling of acrylic monomers constitute a disadvantageous complication. In addition, this gel system tends to exhibit crystalline material causing turbidity.

DE-A 4 023 310 and DE-A 4 126 702 describe fireproofing gels of aluminium tris-phosphate ethanolamine salts, which can be used for various purposes. Such gel layers are very suitable for production without complications but are still worthy of improvement with regard to the melt behaviour of flame application.

According to a prior proposal of the Applicant (German Application P 42 26 044.2), aqueous solutions of ethanolamine salts of aluminium phosphates are modified with 2 to 5 moles of boric acid (for example in the form of its ethanolamine salts) per mol of aluminium phosphate. If such solutions are to be used as fireproofing gels, good results are obtained only with the addition of gel formers of other types, for example acrylamide. In the case of such systems, the boron content is relatively high and, here too, the practical necessity of additional handling of acrylic monomers and the polymerization thereof constitute a complication of the preparation process.

Gel formers which are free of organic gel formers have now been found, which are characterized in that they contain a) acidic aluminium phosphates, optionally in the form of reaction products with 0.01 to 4 mol of alkanolamines per mol of aluminium phosphate, and b) reaction products of boric acid with alkanolamines, a) and b) being present in a weight ratio of 100:55 to 100:0.5, calculated as solids. These fireproofing gel formers are easier to handle than those known to date.

Such gel formers can be converted into gels by heating. Suitable temperatures for this purpose are, for example, those in the range from 45° to 100° C.

A particularly suitable embodiment of the gel formers according to the invention is characterized in that they contain about 0.5 to 85% by weight of water and aluminium, boron, phosphorus and alkanolamine, in particular monoethanolamine, in atomic or molar ratios of

| Al | : | B | : | P | : | alkanolamine |
|---|---|---|---|---|---|---|
| 1 | : | 1.2 to 1.8 | : | 2.3 to 3.7 | : | 2.3 to 3.7. |

The water content is understood as being the amount of water which escapes on drying at 80° C. and atmospheric pressure until constant weight is reached. Since the final amounts of water are dried out of the system only with difficulty, the lower limit of the water content (0.5% by weight) can be stated only as an approximate figure. The water content is preferably 15 to 60% by weight.

The atomic or molar ratio of

Al:B:P:alkanolamine is preferably

1:1.3 to 1.7:2.4 to 3.6:2.4 to 3.6 and particularly preferably

1:1.4 to 1.6:2.8 to 3.2:2.8 to 3.2.

Very particularly preferably, the atomic or molar ratio of

Al:B:P:alkanolamine is

1:1.5:3:3.

Suitable acidic aluminium phosphates are, for example, aluminium salts of oxo acids of phosphorus, in particular of those of pentavalent phosphorus, which are acidic in an aqueous medium. Reaction products of one atom equivalent of aluminium ($Al^{3+}$) in the form of alumina and/or aluminium hydroxide with 2.3 to 3.7, preferably with 2.8 to 3.2, moles of orthophosphoric acid are preferred. These reaction products may be present in an aqueous medium in concentrations of up to 90% by weight and are then clear liquids. The concentration of such reaction products in the aqueous medium is preferably between 50 and 85% by weight.

If desired, aluminium phosphates can be reacted exothermically, in an aqueous medium, in this concentration, with 0.01 to 4 moles of alkanolamine, relative to 1 mol of aluminium phosphate.

Preferred gels according to the invention can be prepared, for example and preferably, by first reacting an aluminium compound capable of aluminium phosphate formation, in particular aluminium hydroxide, and a phosphorus compound capable of aluminium phosphate formation, in particular orthophosphoric acid, in the desired Al:P molar ratio in the presence of water at, for example, 70° to 120° C. to give an aluminium phosphate solution. This may have, for example, a solids content of at least 40% by weight, preferably 70 to 85% by weight. This solution is preferably allowed to ripen for at least 2, particularly preferably 4 to 40, hours at 10° to 40° C.

Separately therefrom, a boron compound capable of alkanolamine salt formation, in particular orthoboric acid, and an alkanolamine, in particular ethanolamine, can then be combined in the desired B:alkanolamine molar ratio in the presence of water, and the preferably ripened aluminium phosphate solution can be added to this solution in the desired molar ratio. A solution of gel formers according to the invention then forms with moderate heating to, for example, about 75° C.–95° C. After cooling to, for example, below 45° C., this solution can be readily stored and has a low viscosity.

The formation of gels according to the invention, optionally with shaping, can be achieved, for example, by heating for 3 to 80 hours, preferably 10 to 40 hours, to one or more temperatures in the range of, for example, 45° to 120° C., preferably 60° to 95° C. At temperatures above 100° C., it may be necessary to carry out gelling in a closed system. The gel formation can be carried out directly with freshly prepared gel former solution. However, it is preferable to store the gel former solution for at least 24 hours at room temperature before gel formation.

The boron/alkanolamine solution may contain, for example, 40 to 100% by weight of solids, and the aluminium phosphate solution, if necessary preferably after appropriate dilution, as a solution containing 40 to 75% by weight of solids, is combined with the boron alkanolamine solution.

The alkanolamines to be used may also contain ether groups. Preferred alkanolamines are those which are obtainable by reaction of amines or ammonia, preferably aliphatic amines having one or more amino groups or ammonia, with up to 50 mol of alkylene oxide, preferably ethylene oxide and/or propylene oxide, per NH group. Monoethanolamine is very particularly suitable as the alkanolamine. Amine mixtures may also be used.

If desired, 0.01 to 4 mol of alkanolamine may be used per atom equivalent of aluminium ($Al^{3+}$) for the reaction of acidic aluminium phosphates with alkanolamines. Preferably, the amount of alkanolamine used is no more than that required for achieving a pH of 8 (in aqueous, 50% strength by weight medium). In the case of aluminium dihydrogen phosphate [$Al(H_2PO_4)_3$], it is possible to use, for example, 2 to 4 mol, preferably 2.3 to 3.7 mol, of monoethanolamine.

All oxo acids of boron are in principle suitable as boric acid, in particular orthoboric acid, and precursors thereof, for example boron oxides and hydrated boron oxides, from which orthoboric acid can form as a result of hydrolysis. The statements made above for the reaction with aluminium phosphates are applicable in corresponding form for the alkanolamines to be used for the reaction with the boric acid. Here too, monoethanolamine is preferred.

In general, 0.5 to 4, preferably 1.3 to 3.1, mol of alkanolamine are used per atom equivalent of boron ($B^{3+}$) in the form of boric acid or boric acid precursors. The reaction may be carried out in the absence of water but is advantageously effected in an aqueous medium concentrations such that the reaction product is then present in a concentration of 50 to 100, preferably 60 to 100%, by weight.

Gel formers according to the invention, which contain reaction products of aluminium phosphates with alkanolamines and boric acid with alkanolamines, preferably have the same alkanolamine or amine mixture or alkanolamine mixture in each of the two reaction products.

If the amounts of boron-containing component are too high, the clarity, the ageing resistance and the gelling capacity may be adversely affected.

In a further procedure, a separate boron-containing component which also contains aluminium, for example in a molar ratio of aluminium to boron (Al:B) of 1:2 to 1:10, preferably 1:3 to 1:6, is first prepared from an acidic aluminium phosphate and a reaction product of boric acid and alkanolamine in an aqueous medium, and this boron-containing component is then mixed, in an aqueous, for example 50 to 70% strength by weight medium, with further acidic aluminium phosphate or with a reaction product of acidic aluminium phosphate and alkanolamine, and is caused to react. Here too, care should be taken to ensure that the stated gross weight ratios of aluminium to phosphorus to boron to alkanolamine as stated above are maintained.

It is also possible, but less preferable, to react a reaction product of acidic aluminium phosphate and alkanolamine, which reaction product is present in an aqueous medium, with corresponding amounts of boric acid or precursors thereof, it also being possible for the fireproofing gel formers according to the invention and having the required gross composition to be formed. In a comparable manner, it is possible, for example, first to react orthophosphoric acid with alkanolamine, then to react boric acid and then aluminium hydroxide therewith in an aqueous medium, a fireproofing gel former according to the invention also finally being obtained.

The individual components may also be combined in another manner, for example when it is desired to work competely or partially in a continuous procedure and/or in a one-pot process. For example, a reaction of the aluminium phosphate solution with the alkanolamine can first be carried out and the boron compound then added, or the boron and/or phosphorus compound can first be reacted with an alkanolamine and then, for example, freshly precipitated aluminium hydroxide added.

This means that the order of the steps which lead to the preparation of the gel formers according to the invention can be varied within a wide range.

The preparations of the aluminium-containing component and of the boron-containing component are preferably carried out at temperatures between 20° and 100° C. and in an aqueous medium in which the individual component is finally present in a concentration between 50 and 85% by weight. Mixing of the aluminium-containing component with the boron-containing component is carried out in general at 18° to 95° C. If necessary, it is possible briefly to heat up to about 100° C. Excessively long heating to temperatures above 40° C. should be avoided in the case of all components and component mixtures, since otherwise premature gelling or an increase in viscosity may occur.

Instead of the preferably used two-pot process in which an aluminium phosphate solution and a boron/alkanolamine salt solution are first prepared and the two solutions are then combined by stirring or in a continuous mixer, one-pot processes may also be used.

It is also possible initially to use high solids concentrations and then to reduce these before, during or after the formation of the gel former solution by dilution.

Additives, for example surfactants, adhesion promoters, colourants, pore nucleating agents, fillers, light stabilizers, antioxidants and/or reinforcing agents, may optionally be added to the gels according to the invention, the starting materials for their preparation or the gel formers according to the invention. Such additives are known per se, for example wires, fibres, woven fabrics or nets.

The gel formers and gels according to the invention are very particularly suitable for purposes of fireproofing, as fireproofing gel formers or fireproofing gels.

One of the important advantages of the fireproofing gel formers according to the invention is that their viscosity is substantially below the viscosity of a corresponding boron-free aluminium phosphate/alkanolamine gel former of the same concentration, even at solids contents of more than 60% by weight in an aqueous medium.

This means that fireproofing gel formers according to the invention have a better shelf life and, owing to the reduced viscosity, can be considerably more easily handled than boron-free gel formers based on aluminium phosphate.

Even with the addition of amounts of about 10% by weight of the boric acid/alkanolamine component (relative to the sum of the boric acid/alkanolamine component and the aluminium phosphate component), a fireproofing gel former having greatly reduced viscosity which forms a gel which remains clear for 200 hours at 80° C. is obtained. The dry matter, obtained, for example, by drying at 120° C. the gel former modified in this manner, foams, at temperatures of 600° C., by about 30% by volume more than the dry matter obtained from a corresponding fireproofing gel former containing no boric acid/alkanolamine component.

The gel former solutions have a good shelf life, even at temperatures of up to about 40° C. For example at 90 ° C., the gels form within a few hours as clear, heat-stable gels which are distinguished by good mechanical stability and, surprisingly, do not tend to flow on flame application at temperatures in the range from 100° to 600° C.

In contrast to gels which are obtained without the addition of boron alkanolamine reaction products or with the addition of insufficient amounts of boron component or with the use of excessive amounts of boron or alkanolamine, at temperatures above 100° C. gels according to the invention no longer tend to form a flowing melt which can flow away on flame application. This is a technically important, surprising advantage of the gels according to the invention.

Furthermore, gels according to the invention have improved fine-pore intumescence. The gel former solutions have relatively low viscosities even at solids concentrations of more than 65% by weight. Even in the case of dilutions to a solids content of less than 40% by weight, they are still gellable and have in general moderate pH values of between 5 and 6. The gels formed therefrom and free of additional gel formers have a substantially reduced tendency to crack and tend not to flow at elevated temperatures. In addition to the good storage stability at constant, even elevated temperatures, the gels also have good stability during storage under conditions of changing temperature, for example at temperatures fluctuating between −18° C., +20 ° C. and +80° C.

The fireproofing gel formers and fireproofing gels according to the invention may optionally additionally contain, for example, surfactants, for example organofluorine, nonionic and/or ionic surfactants, other added auxiliaries, for example sugars or polyalcohols for influencing the intumescence behaviour in the case of fires, or auxiliaries for improving the adhesion of the gel, as well as colourants and/or light stabilizers and radiation stabilizers. The water contents before and after gelling are in general less than 50% by weight, preferably between 20 and 40% by weight.

It is possible to apply a fireproofing gel former according to the invention to the surface of a material and to gel it or to dry it there. At temperatures between room temperature and 150° C., preferably between 80° and 120° C., water contents lower than 20% by weight can then also be realized.

The sum of the advantages of the present invention constitutes a considerable technical advance in the area of fireproofing.

In the case of the preparation of fireproofing gels according to the invention, other aluminium compounds which can be converted into aluminium phosphates, for example aluminas, hydrated aluminas, aluminium salts of volatile acids (for example aluminium chlorides, carbonates or acetates) or aluminium borates, may also optionally be used, in addition to or instead of the preferred aluminium hydroxide. In addition to aluminium compounds, it is possible to use, for example in an amount of up to 20 mol %, relative to aluminium, other metal compounds, for example those of the 1st to 4th main group of the Periodic Table of Elements and/or of iron, cobalt and/or nickel.

Other phosphorus compounds which can be converted into aluminium phosphates, for example dehydrated forms of orthophosphoric acid, phosphorus oxides, phosphonic acids, phosphinic acids, phosphoric esters and/or phosphoric acid salts, the latter, for example, in the form of ammonium and/or alkanolamine salts, may optionally be used in addition to or instead of the preferred orthophosphoric acid.

Other boron compounds, for example dehydrated forms of orthoboric acid, boron oxides, ammonium borates and/or borates of other amines, in particular alkanolamine borates, may optionally be used in addition to or instead of the preferred orthoboric acid.

Other alkoxylation products of ammonia, such as diethanolamine and triethanolamine, anchor other, preferably aliphatic amine compounds, for example ammonia, ethylenediamine, polyalkylenepolyamines, piperazines and/or morpholines, may optionally be used in addition to or instead of the preferred ethanolamine.

Fireproofing gels according to the invention may be used, for example, for the production of fireproofing or surface-treating (antifogging, hardness) coatings, impregnations, joint sealants, cements, moldings, sealing tapes, constructional elements, intumescence pigments and/or intumescence fillers. In the case of these applications, the gels may contain, for example, from 0 to 90% by weight of water.

The gel formers and gels according to the invention are naturally alkali-free and have a number of further advantages: thus, for example, no addition of monomers (acrylamide) is required and complications due to its handling and polymerization are dispensed with. Nevertheless, gel formers and gels according to the invention may optionally be combined with other gel formers or gels, for example with (poly)acrylamide, polyvinyl alcohol, starch, gelatine, proteins or montmorillonites.

The gel former solutions can optionally be further diluted before gelling. A preferred diluent is water, but the addition of water-miscible organic solvents is also possible, at least in a proportionate amount.

In addition to the additives already mentioned, additions of carbonizing polyalcohols, for example sugars, glycols, glycerol, pentaerythritol and/or polyvinyl alcohols, and other water-soluble oligomeric or polymeric additives, are also suitable. In specific cases, provided that clear gel layers are not required, polymer dispersions may also be mixed with gels or gel former solutions according to the invention. Adhesion promoters, surfactants, light stabilizers, UV and IR filter substances and colour-imparting additives are optionally added, for example in amounts of less than 3% by weight, preferably less than 1% by weight, relative to the gel according to the invention. Fillers and carbonizing additives can optionally be used, for example, in amounts of from 1 to 75% by weight, preferably 20 to 60% by weight, based on the total mixture.

Absorptive substrates, for example powders, fibres, foams, cellulose materials, papers, nonwovens, woven fabrics or mixed fabrics, may be impregnated with gel precursor solutions according to the invention and gelling can then be carried out, optionally after shaping. Materials having a good fire-retardant action and intumescent character capable of ceramization, which can be used as auxiliaries, engineering materials or construction elements in preventive fireproofing, for example for the production of cable bulkheads, flameproof windings and flameproof sheaths, cavity fillings, sealing elements and fire barriers, are obtained here without drying or after partial or complete drying.

Of interest in preventive fireproofing or in the production of shaped articles or light-weight engineering materials is the combination of the gels according to the invention with expandable materials, for example expandable silicates or graphites in unexpanded or partially or completely expanded form, for example by adding the gels or gel former solutions according to the invention to such graphites and/or silicates and optionally subjecting this mixture to shaping and/or a thermal after-treatment, for example between 80° and 1000° C.

Gels according to the invention may also be used in comminuted form or the gel former solutions in spray-dried form or in the form of material powdered after drying, in solid form or (owing to their intumescence properties) in thermally partially or completely expanded form, as insulating and fire-retardant cavity filling, as a filler, as a coating or, optionally in combination with mineral fibres, organic fibres and/or other reinforcing elements (for example wires or lattices), in a form compressed to give sheets or mouldings of another type, preferable for fireproofing purposes.

Since the gel former solutions according to the invention have film-forming character, they are suitable not only as impregnating agents but also, particularly in the case of water contents of 5 to 50% by weight, for finishing or coating rigid or flexible substrates and impart improved fire resistance to these, for example metals (such as aluminium), woods, fabrics, ceramics or plastics.

The invention is illustrated below by way of example. The stated parts and percentages relate to the weight, unless stated otherwise.

EXAMPLES

Example 1

A 55% strength solution of 1 mol of aluminium phosphate in the form of a reaction product prepared at 100° C. in water from 1 mol of aluminium hydroxide with 3 moles of 85% strength orthophosphoric acid was stirred with 3.1 mol of ethanolamine, beginning at 20° C. During this procedure, the temperature increased to 75° C. After a few minutes, the solution was clear and was cooled to 20° C. The solids content was 66% by weight. After 16 hours at 20° C., a viscosity of 3800 mPa.s was measured (Haake Viscotester VT 02/1).

A 66% strength solution in water of the reaction product of 1 mol of orthoboric acid and 1 mol of monoethanolamine was prepared.

9 parts of the aluminium-containing solution and 1 part of the boron-containing solution were then mixed at room temperature and a clear solution was obtained. This was stored for 16 hours at 20° C. and the viscosity was then determined as above. It was 630 mPa.s.

Thereafter, the mixture was introduced into a glass bottle and placed in a heating oven heated to 80° C. After 4 hours, the material had gelled; after 12 hours, it was removed from the heating-oven and cooled. A clear stable gel had formed.

The bottle containing the gel was then once again introduced into the heating oven heated to 80° C. and left therein for 180 hours. Thereafter cooling was carried out. No opacity of the gel was found.

Example 2

A 70% strength solution of 1 mol of aluminium dihydrogen phosphate in water was first prepared. A 70% strength solution of the reaction product of 5 mol of orthoboric acid and 5 mol of monoethanolamine was added to this solution at 50° C. Gentle heating gave a clear solution, which was diluted to a content of 66%. It was then mixed with the 66% strength solution of an aluminium phosphate/ethanolamine component (prepared as in Example 1) in the ratios shown in the Table, the viscosities likewise mentioned being subsequently measured as in Example 1.

| % of aluminium-containing component | *) 100 | 90 | 80 | 70 | *) 50 |
|---|---|---|---|---|---|
| % of boron-containing component | — | 10 | 20 | 30 | 50 |
| Viscosity [mPa.s at 20°C.] | 3800 | 1080 | 870 | 700 | 580 |

*)For comparison

All these mixtures were introduced separately for 24 hours into a heating oven heated to 80° C. and were then cooled. It was found that all samples, except for the 50%/50% sample, had formed a clear stiff gel. The 50%/50% sample could not be gelled even with longer heating.

The two first-mentioned samples (100%/0% and 90%/10%) were kept at 80° C. for a further 180 hours. No changes were detectable. This means that the improved handling properties as a result of lower viscosity are not accompanied by a deterioration in the ageing resistance.

Example 3

Preparation of an Al phosphate solution (not according to the invention)

624 parts of hydrargillite (technical-grade aluminium hydroxide) were introduced into 2766 parts of 85% strength orthophosphoric acid (molar ratio Al:P 1:3) and 262 parts of water and stirred at 100° to 110° C. for 4 hours. A clear solution having a solids content of 70% was formed. This was diluted to 65% with 279 parts of water and cooled to room temperature. This solution is referred to below as AP solution.

Example 4

Preparation of a solution of a boric acid/ethanolamine complex (not according to the invention)

741.6 parts of orthoboric acid were dispersed in 1187.6 parts of water, and 1464 parts of ethanolamine (molar ratio B:amine 1:2) were added with thorough stirring. The temperature increased to about 45° C., and a clear, 65% strength solution was formed. The solution was cooled to room temperature. This solution is referred to below as BE solution.

Example 5

Preparation of a boron-free complex from the AP solution and ethanolamine in a molar ratio Al:P:amine=1:3:3 for comparative purposes (not according to the invention)

625 parts of the AP solution (after storage for 40 hours at room temperature) were diluted to 55% with water. 210 parts of ethanolamine were then added with thorough stirring. The reaction mixture was heated to 75° C., and a clear solution formed. The solution was cooled to room temperature in the course of 15 minutes and adjusted to a solids content of 65% with 17 parts of water. After ripening for 30 hours at room temperature, the solution had a viscosity of 3500 mPa.s, measured at 20° C. with the Haake Viscotester. This solution is referred to below as APE solution.

Example 6

Preparation of a gel former solution according to the invention 212 parts of BE solution were initially introduced into a stirred pot, and 244.6 parts of AP solution (ripened for 4 hours at room temperature) were added with thorough stirring at 25° C. The molar ratio was 2:3, corresponding to the composition $AlB_{1.5}P_3amine_3$. Heating to 70° C. gave a clear, 65% strength gel former solution, which was immediately cooled to room temperature. After ripening for 24 hours at room temperature, the solution had a viscosity of 600 mPa.s at 20° C., measured using the Haake Viscotester. This solution is referred to below as APBE solution.

The decrease in viscosity compared with the boron-free solution of Example 5, having the same concentration, is evident from the measured viscosity.

Example 7 (not according to the invention)

Gelling of the APE solution, of the AP solution and of the BE solution for comparative purposes One test tube in each case was half-filled with the BE solution, with the AP solution (aged for 40 hours at room temperature) and with the APE solution (aged for 40 hours at room temperature), and the test tubes were closed. The three test tubes were then placed horizontally and heated for 12 hours at 80° C. After this time, the BE solution and the AP solution were still liquid while the APE solution had gelled to give a mechanically stable, clear gel which did not coalesce when the tube was placed in a vertical position at room temperature (the latter gel is referred to below as gel 7).

The AP solution and the BE solution did not gel even on prolonged heating.

Example 8

Gelling of the gel former solution APBE according to the invention

A procedure analogous to Example 7 was used with the APBE solution from Example 6. A clear, mechanically stable gel which did not coalesce in the vertical position both at room temperature and at 80° C. was likewise obtained (this gel is referred to below as gel 8).

Example 9

Comparison of the ageing behaviour of gel 7 and gel 8 a) Gel 7 and gel 8 were heated at 80° C. for 300 hours and then assessed: Gel 7 shows strong opacity at certain points while gel 8 had remained clear and stable.

b) Gel 7 and gel 8 were stored at room temperature for 6 months in the presence of light and then assessed: Gel 7 shows substantial opacity at certain points while gel 8 remained clear and stable.

These ageing experiments showed the good ageing properties of gels according to the invention.

Example 10

Comparison of the melting behaviour of gel 7 and gel 8 a) The test tubes obtained according to Examples 7 and 8 and half-filled with stable gel in the horizontal position were placed vertically and subjected laterally to a heated air stream, the temperature of which increased from 20° to 300° C. in the course of 30 seconds and then remained at 300° C. (hot-air blower). The melting behaviour of the gels was assessed: Gel 7 melted within 30 seconds and coalesced at the bottom of the vertical test tube to give a bubbling melt. After 1 minute, the major part of the gel had coalesced to form a melt at the bottom of the test tube.

In the case of gel 8, no melting and coalescence occurred. During the thermal stress, a large number of small cracks and small bubbles formed in the gel without the latter running away in liquid form. In the course of 60 seconds, the entire gel had swelled up, without running, to give a mass containing fine bubbles.

b) The same phenomena were observed as the temperature of the hot air stream was increased to 500° C. in a corresponding experiment.

Experiments a) and b) show the good melt stability of the gel obtained from the gel former solution according to the invention.

Example 11

Effect of ageing of the AP solution on the gel properties a) An AP solution was prepared according to Example 3 but, immediately after a clear solution was obtained, the latter was cooled to room temperature and immediately thereafter processed according to Example 6 to give a gel former solution. The gelling experiment according to Example 8 was then carried out at 90° C. and assessed:

No gel was obtained after 12 hours. The precursor was still liquid.

b) The experiment was repeated with an AP solution which had been aged for 1 hour at room temperature. In this case too, no gel was obtained.

c) The experiment was carried out again with an AP solution aged for 2 hours at room temperature. A mechanically very soft gel which tended to coalesce when placed in the vertical position was now obtained.

d) A further repetition with an AP solution aged for 3 hours at room temperature gave a mechanically soft but stable clear gel. This gel showed almost the good melt stability under thermal stress (cf. Example 10, gel 8).

Example 12 (not according to the invention)

Demonstration of the change in the gel character in the case of compositions of the gel former solution or of the gel which differ from the composition according to the invention a) The procedure was as in Example 6, except that a BE solution, in the preparation of which twice the amount of ethanolamine had been used, was employed.

In the gelling experiment analogous to Example 8, the material remained liquid instead of a gel being obtained.

b) The procedure was analogous to Example 6, except that 1.5 times the amount of the BE solution was used.

In the gelling experiment analogous to Example 8, the material remained liquid instead of a gel being obtained.

c) The procedure was analogous to Example 6, except that only 0.3 times the amount of BE solution was used.

In the gelling experiment analogous to Example 8, initially no gel was obtained but a very soft gel was obtained only after heating for more than 24 hours, which gel, an the heating experiment analogous to Example 10, exhibited undesirable melting which led to coalescence of the thermally stressed gel.

These experiments show that gels having the desired improved properties with respect to gelling behaviour of the gel former solution and melting behaviour under thermal stress are obtained only with gel compositions according to the invention.

Example 13

Modification of the method of preparation of gel formers according to the invention The APE solution obtained according to Example 5 and containing 1.2 mol of the adduct of aluminium trisphosphate and 3 mol of ethanolamine was thoroughly stirred with a 65% strength dispersion of 96.4 parts of orthoboric acid in water (molar ratio Al:B=1:1.3) at 50° C. until a clear solution had formed.

After storage for 30 hours at room temperature, a gelling experiment analogous to Example 8 gave a clear gel which behaved analogously to the gel tested according to Example 8.

Example 14

Continuous preparation of a gel former solution according to the invention

A metering pump delivered 74 parts by volume per minute of an AP solution aged for 25 hours at room temperature. A second metering pump delivered 94 parts by volume per minute of a BE solution aged for 25 hours at room temperature.

Both metering pumps delivered to a stirrer mixing head as customarily used for polyurethane production. In the high-speed mixing head, the components were mixed very rapidly and very thoroughly. The mixing head was followed by a 10 m long transport pipe which had, in the middle, a static mixer by means of which the reaction mixture was subsequently mixed. The clear colourless reaction mixture then flowed over a cooler and, at about 35° C., into storage vessels in which it cooled to room temperature.

In the gelling experiment analogous to Example 8, a clear gel was obtained, which corresponded in its properties to the gel tested according to Example 8.

Example 15

Possibilities of dilution of the gel former solution and the addition of fillers a) A 65% strength APBE solution was diluted with water to solids concentrations of 50, 40, 30, 20, 10 and 5%. Cylindrical test tubes in the horizontal position were then half-filled with the solutions and heated for 24 hours at 80° C. The test tubes were then placed in the vertical position and assessed: gelling had occurred in all cases. In the case of the 10% sample, the gel tended to slip when placed in the vertical position. The 40 and 50% samples exhibited slight opacity and the 30% sample and lower exhibited substantial opacity, which increased with decreasing concentration.

b) A polyurethane foam mat (density 30 kg/m$^3$) was saturated with an APBE solution adjusted to 70%. Thereafter, the mat was packed in polyethylene fill and allowed to gel in the course of 25 hours at 80° C. A flexible composite material which is suitable for flexible, fire-retardant closure of joints, cable bulkheads or wall lead-throughs and for covering cables was obtained.

The advantage of this material is that, in the undried state, it is flexible and can be pressed into cavities of any shape and fits these. When it subsequently dries, it retains the predetermined form without shrinkage and produces a mechanically stable termination to the space which withstands a fire owing to the intumescence of the impregnating agent according to the invention.

c) A gauze bandage was saturated with the APBE solution, rolled up and sealed in a polyethylene film by welding. After gelling at 80° C., the impregnating agent was fixed in the roll. Nevertheless, the roll could be unrolled. The unrolled bandage was then wound in 6 layers around a plastic pipe (diameter 5 cm). The latter did not collapse even after drying on flame application with a natural gas burner and did not burst into flames in the course of 30 minutes.

d) 100 parts of an APBE solution diluted to 60% were thoroughly mixed with 100 parts of glass microbeads and 30 parts of glass fibres (commercial staple fibres). The mixture was introduced into a plastic box mould having the size of a brick and was gelled at 95° C. A solid block of gelled material from which the impregnating solution no longer flowed away was then removed from the mould.

Such blocks can be used as fireproof barriers or, optionally after comminution in the moist state, may serve as cement-like material for fireproofing and at the same time filling joints and cavities.

e) A commercial flexible insulation tube of flexible foam was saturated with an APBE solution diluted to 65% and was then gelled by heating in a microwave field. The undried, modified tube was then still completely flexible but the impregnating agent was fixed in it. This tube in the flexible state can be placed around cables or pipes to be protected and is firm after drying out. Such flexible coverings which stiffen on drying out can be used for fireproofing purposes.

f) 700 parts of commercial expandable graphite of the SO$_x$ type were mixed with 300 parts of the APBE solution and filled into the box mould also used in Example 15 d) and were gelled. A sort of brick which dried almost without shrinkage was obtained. Mouldings for the purposes of preventive fireproofing can be produced from such material by machining or by direct shaping. On heating to temperatures above 180° C., such mouldings swell up with a volume increase of more than 500%, without the expanding expandable graphite coming off in the form of dust. It remained bound within the swelling material.

g) 100 parts of expandable graphite pre-expanded at 270° C. (bulk density 110 g/l) were mixed with 200 parts of APBE solution to give a slurry and were gelled. The gelled material was converted into a thixotropic slurry in a ball mill. This slurry can be introduced into cartridges and can be used as cement or joint filling material for purposes of preventive fireproofing. In the dried state, the material swells by about 400% by volume on flame application.

h) 100 parts of expandable graphite expanded at 650° C. were mixed with 150 parts of 65% strength ABPE solution, and the slightly moist material thus obtained was pressed at room temperature to give a panel about 4 cm thick under a pressure of 0.1 kg/cm$^2$.

The panel was then removed from the mould and was dried in a heating oven at 120° C. A stable electrically conductive panel having a relative density of about 200 g/l was obtained.

The composite panel became water-resistant as a result of subsequent heating at 250°–300° C.

Such panels can be used for shielding purposes or fireproofing purposes. They can also be used as sandwich layers.

Example 16

Paints and coating materials

A 75% strength APBE solution was used as a paint. The solution was applied copiously in an amount of 1.5 kg/m$^2$ with a brush to 3 mm thick beech plywood. After drying, a glossy, nontacky, crack-free and transparent coat was obtained on the wood.

A 10×10×0.3 cm wood sample coated in this manner was installed horizontally over a natural gas burner flame at about 1000° C. so that the flame came into contact with the coated surface in the middle of the square sample. After flame application for 60 seconds, the flame was extinguished.

An insulating, 5 mm high, fine-pored layer of ceramized material had formed on the coated layer. The back of the wood sample was virtually unchanged. No continued burning was observed.

The same experiment was repeated with an untreated plywood sheet of the same type. The untreated wooden board burned away completely.

What is claimed is:

1. A gel former which consists essentially of
   (a) an acidic aluminum phosphate in the form of a salt of 0.01 to 4 mols of an alkanolamine with a mol of aluminum phosphate,
   (b) a reaction product of boric acid with an alkanolamine, and
   (c) 0.5 to 80% by weight of water wherein
   (a) and (b) are present in a weight ratio of 100:55 to 100:0.5, calculated as solids, and the aluminum, boron, phosphorus and alkanolamine in atomic or molar ratios of

| Al | : | B | : | P | : | alkanolamine |
|---|---|---|---|---|---|---|
| 1 | | 1.2 to 1.8 | | 2.3 to 3.7 | | 2.3 to 3.7. |

2. A gel former of claim 1, which contains a reaction product of one atom equivalent of aluminum ($Al^{3+}$) in the form of aluminum hydroxide with 2.3 to 3.7 moles of orthophosphoric acid and a reaction product of one atom equivalent of boron ($B^{3+}$) in the form of boric acid or boric acid precursors with 0.5 to 4 moles of an alkanolamine.

3. A gel former of claim 1, which contains less than 50% by weight of water.

4. A gel obtainable from a gel former of claim 1, by heating the gel former to temperatures in the range from 45° to 120° C. for 3 to 80 hours.

5. A process for the preparation of solutions containing a gel former of claim 1, in which an aluminum compound capable of aluminum phosphate formation and a phosphorus compound capable of aluminum phosphate formation are reacted in a molar ratio of 1:2.3 to 1:3.7 in the presence of the water to give an aluminum phosphate solution, separately therefrom a boron compound capable of amine salt formation and an amine are combined in a molar ratio of 1:1.3 to 1:3.1 and the aluminum phosphate solution is added to this solution in a molar ratio of Al:B of 1:1.2 to 1:1.8.

6. The process of claim 5, in which aluminium hydroxide, orthophosphoric acid, orthoboric acid and ethanolamine are used.

7. A gel obtainable from a gel former produced by the process of claim 5, which comprises heating the gel former to temperatures in the range from 45° to 120 ° C. for 3 to 80 hours.

* * * * *